(12) United States Patent
Chesson

(10) Patent No.: US 11,653,066 B2
(45) Date of Patent: May 16, 2023

(54) INTERACTIVE DIGITAL MEDIA PLAYBACK AND TRANSACTION PLATFORM

(71) Applicant: Duzy IOD LLC, New York, NY (US)

(72) Inventor: Peter L. Chesson, New York, NY (US)

(73) Assignee: Duzy IOD, LLC, Florham Park, NJ (US)

( * ) Notice: Subject to any disclaimer, the term of this patent is extended or adjusted under 35 U.S.C. 154(b) by 0 days.

(21) Appl. No.: 16/664,016

(22) Filed: Oct. 25, 2019

(65) Prior Publication Data

US 2021/0127170 A1 Apr. 29, 2021

(51) Int. Cl.
| | |
|---|---|
| H04N 21/478 | (2011.01) |
| H04N 21/4782 | (2011.01) |
| H04N 21/431 | (2011.01) |
| H04N 21/8545 | (2011.01) |

(52) U.S. Cl.
CPC ... *H04N 21/47815* (2013.01); *H04N 21/4316* (2013.01); *H04N 21/4782* (2013.01); *H04N 21/8545* (2013.01)

(58) Field of Classification Search
CPC ........ H04N 21/47815; H04N 21/4782; H04N 21/4316; H04N 21/8545
See application file for complete search history.

(56) References Cited

U.S. PATENT DOCUMENTS

| | | | |
|---|---|---|---|
| 10,334,320 B2* | 6/2019 | Chesson | .......... H04N 21/47815 |
| 2003/0131357 A1* | 7/2003 | Kim | ................... H04N 21/4312 |
| | | | 725/112 |
| 2009/0276805 A1 | 11/2009 | Andrews, II et al. | |
| 2011/0252132 A1* | 10/2011 | Wetzer | ..................... G06F 9/542 |
| | | | 709/224 |
| 2013/0054757 A1 | 2/2013 | Spitz et al. | |
| 2015/0074711 A1 | 3/2015 | Spitz et al. | |
| 2015/0289022 A1* | 10/2015 | Gross | ................... H04N 21/472 |
| | | | 725/51 |
| 2017/0280198 A1* | 9/2017 | Krishnamoorthy | ......................... H04N 21/4828 |
| 2019/0373337 A1* | 12/2019 | Martell | ................ H04N 21/812 |
| 2020/0186857 A1* | 6/2020 | Easley | ............... H04N 21/4886 |
| 2020/0258061 A1* | 8/2020 | Beadles | ............. G06Q 20/3678 |

OTHER PUBLICATIONS

Ex Parte Reexamination Request for U.S. Pat. No. 10,334,320 issued Jun. 25, 2019, 95 pages.
Reexamination proceedings for U.S. Appl. No. 90/014,416, (U.S. Pat. No. 10,334,320), 258 pages.

* cited by examiner

Primary Examiner — Oschta I Montoya

(74) Attorney, Agent, or Firm — Jack Baldini, Esq.

(57) ABSTRACT

A system and method to execute, via a graphical user interface of a video player, playback of video content including a cue object corresponding to an item. An overlay is generated within the display, wherein the overlay includes an interactive portion configured to receive a user interaction associated with the cue object. A user interaction corresponding to the cue object is received via the interactive portion of the overlay. In response to the user interaction, a transaction associated with the item is processed.

17 Claims, 13 Drawing Sheets

INTERACTIVE DIGITAL MEDIA PLAYBACK AND TRANSACTION PLATFORM

TECHNICAL FIELD

The present disclosure relates to digital media players, and more particularly, to a video player configured to enable a transaction relating to an item associated with the video content.

BACKGROUND

Media transmission and video playback through television, Internet websites, mobile applications, and on computers, tablets, smartphones, and the like, have become mainstream. Video content distribution and playback via conventional video players limit the interaction a viewer can have with the video content. Such interactions are limited to zooming in, fast forwarding, reversing, pausing or capturing still images. However, users do not have the ability to interact with specific media content items embedded within the video content.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
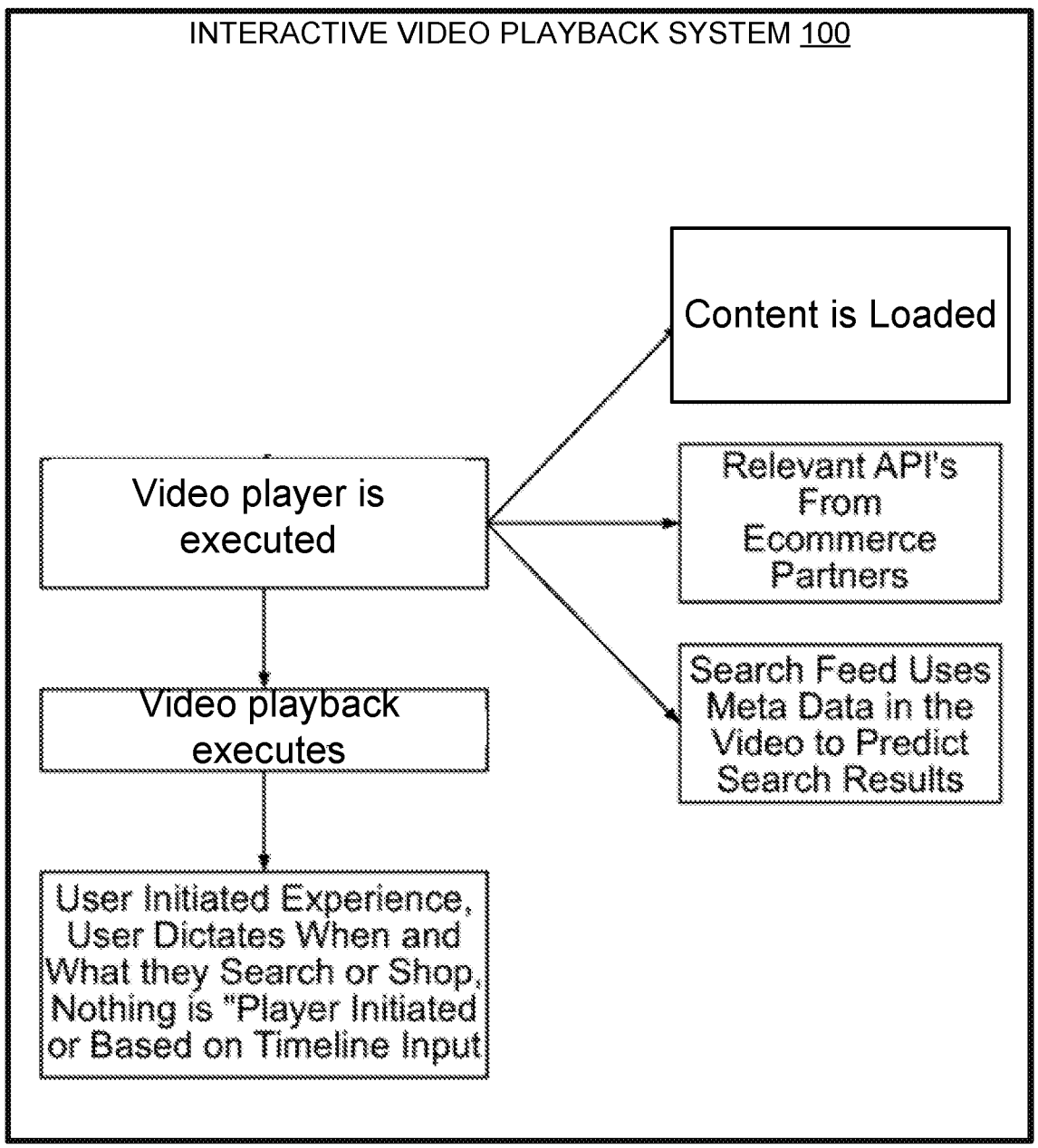
FIG. 1 is a diagram illustrating example processing by an interactive video playback system, in accordance with one or more embodiments of the present disclosure.

Aspects of the present disclosure are directed to an interactive video playback system to enable interaction with video content in a video player environment. In an embodiment, the interactive video playback system executes playback of video content including one or more items that can be the subject of a transaction. The interactive video playback system includes a video player having a graphical user interface (GUI) to play the video content. In an embodiment, the GUI includes a graphical overlay of one or more interactive portions (e.g., icons and clickable features) displayed to a user system corresponding to a video player to control and/or interact with the video content.

The interactive video playback system further provides, via the graphical user interface, an interactive portion configured to enable a user system to interact with an interactive portion corresponding to an item to initiate a transaction process (e.g., a purchase of the item).

In an embodiment, the interactive video playback system generates and displays the video content in response to a user action (e.g., selecting a "play" button", launching a video player of the interactive video playback system). The interactive video playback system generates an overlay including an interactive portion to enable a user to interact with the video to initiate a transaction associated with an item currently or previously displayed within the video content. In an embodiment, the interactive video playback system can embed or integrate one or more cue objects within the video content, wherein the cue object is configured as the interactive portion which a user system can interact with by either directly clicking it or clicking through an additional portion (e.g., a menu) to obtain more information about eh corresponding item or execute a transaction associated with the item.

In an embodiment, a user can elect to purchase an item included in the video content (e.g., an advertised product) and execute the transaction from within the video player itself, without being redirected to a separate third party website. Advantageously, the transaction can be fully executed within the video player of the interactive video playback system (e.g., a completed purchase) efficiently and effectively by avoiding the need for the user system to visit a separate website or application, log in to the separate website or application, or interact directly with another entity.

According to an embodiment, the user system can login to the interactive video playback system to enable the interactive video playback system to store information associated with a user (e.g., a username, password, payment information, delivery information, etc.). In an embodiment, a user system can identify an item of interest within the video content being played and interact with an interactive portion of the video player to initiate and complete a transaction associated with the item from within the video player, as described in greater detail below.

Advantageously, the interactive video playback system overcomes the limitations of conventional video players which employ timeline-dependent cue point triggers which call or retrieve advertisements from an ad server, plays the advertisements, and then discards the advertisements. In addition, the interactive video playback system overcomes the need to execute the transaction via a third party website, application or platform, thereby reducing the time and computing expenditure associated with conventional transaction processing systems. In addition, the conventional systems which redirect a user system to a third party environment to execute a transaction create security issues as well disruptions to the video playback experience.

In an embodiment, the interactive video playback system includes payment handling functionality, enabled within the video player itself, to complete a transaction within the video player environment. Moreover, this functionality is translatable to existing third party media players so as to transform third party media players to enable media playback and transaction processing functionality. In an embodiment, the payment handling functionality (also referred to as a "payment handler") can include a component or module of the interactive video playback system wherein a single source payment entity (providing single login functionality to the user system) having pre-configured accounts with any number of purveyors or fulfillment centers to enable the one or more items to be directly shipped to any designated user, wherein the payment handler serves as a custodian of funds to facilitate the transaction.

As disclosed herein, the interactive video playback system provides user systems with an 'interactive on demand' ("IOD") experience which allows the user systems to control interacts with the video content and enable convenient transactional capabilities from within a the video player. In an embodiment, upon loading an enabled video (e.g., video content having one or more embedded cue objects representing an interactive portion associated with an item included in the video content), a video player can execute one or more machine learning algorithms to determine which video, API Commerce Feed and search query data (e.g., intent based on machine learning and first party data) to populate within the video player. Advantageously, the video content does not include a predetermined timeline with cue point triggers enabled for a user system to see or engage with a media campaign. In an embodiment, the IOD functionality of the interactive video playback system provides a user-controlled experience that is configured to allow a user the ability to select when and how to interact with preprogrammed features within a video, independent of a timeline of the video content.

According to embodiments of the present disclosure, the user system initiates player interaction at any point within the viewing experience, having a choice of one or a plurality of interactive portions (e.g., cue objects) with which to interact, at any point during the viewing experience, or multiple times during the viewing experience, all without the need to 'call' advertisements from an ad server. In addition, the interactive video playback system provides the user system with 'order here—transact here' functionality within the video player environment. In an embodiment, the 'order here' functionality enables a user system to initiate and complete a transaction (e.g., a purchase) relating to an item corresponding to the video content, without redirecting the user system to an external website, platform, or application. In an embodiment, the user system can login to the video player of the interactive video playback system, wherein the video player includes payment handling and order fulfillment functionality such that an entire transaction can be completed within the video player itself.

According to embodiments, the interactive video playback system enables a 'smart' or intuitive online shopping experience. For example, a viewer can become interested in a particular product while viewing the video content, such as, an actor wearing a particular pair of sunglasses, or riding a particular kind of bicycle, or wearing a particular piece of jewelry, or hitting a particular kind of golf ball, or simply eating a slice of pizza. In an embodiment, one or more items integrated or included in the video content itself can be associated with a cue object that enables a viewer to interact with the item of interest. In an embodiment, the viewer becomes interested by seeing the item in the video content and interacts (e.g., clicks on) the item within the video or an associated menu (e.g., a menu bar overlaying the video content) to cause an event (e.g., provisioning of information associated with the item, initiating a transaction associated with the item, etc.).

In an embodiment, without leaving the video player environment, the interactive video playback system generates a video overlay that enables the user to interact with the one or more cue objects associated with the video content. In an embodiment, the user system can interact with the cue object via the overlay to perform a search, obtain information about an item, etc., while playback of the video content continues uninterrupted. In this regard, the user system can access additional information and functionality overlaying a continuous stream of video content. In an embodiment, the user system is presented with information about the clickable or cue-enabled item (a cue object), at any point during video playback (e.g., when the cue object is visible in the video content, after the cue object is no longer viewable within the then current portion of the video content). For example, the interactive video playback system enables a user system to directly interact with a cue object presently displayed in the video content or accessible when not viewable, such that the cue object remains accessible through the overlay by the user system generated by the interactive video playback system during an entire length of the video content.

In an embodiment, a user system can interact with the cue object (e.g., an interactive portion of the graphical user interface associated with the item in the video content) and within the video player itself, without having to call information from an ad server, the video player displays information about the item, including an option to purchase the item. In an embodiment, the user system can initiate a transaction process associated with the item using an enabled payment handler module configured to execute the transaction, without the user system being redirected to a computing system external to the video player. In an embodiment, the interactive video player system can be integrated with an existing video player to provide transaction processing functionality within an existing video player.

The foregoing has several advantages over conventional video player systems. For example, use of the interactive video playback system (e.g., as a stand-alone player and platform available on any website, or as a module integrated to overlay existing media player streams) provides high user engagement, drives brand awareness increases brand loyalty, enhances multi-channel campaign efforts (e.g., a particular brand of peanut butter, co-marketing with a particular brand of jelly, with the video participant/actors consuming the particular combination within the video content, and provides additional information and functionality within a same computing environment (e.g., within the video player). In an embodiment, existing video streams can be transformed by the interactive video playback system to enable existing products already present within the video content to become cue objects.

As a result, certain advertisement enhancements are developed. In an embodiment, the interactive video playback system provides relevant content and product recommendations based on an individual's preferences, social groups, browsing/buying patterns, favorites and browsing history. The interactive video playback system connects user systems (e.g., potential consumers) with brands that drive sales through a curated content experience while boosting engagement and lift conversion rates significantly.

In an embodiment, the interactive video playback system of the present disclosure creates new revenue streams by providing transactions from the advertising revenue. In an embodiment, an item (e.g., products and services) included in video content can be tagged as a cue object that a user system can interact with in connection with the playback of the video content. Advantageously, the cue object enable interact with an item to allow a user to initiate a transaction (e.g., collection of information, a purchase, etc.), without 'pushing' an item on the viewer (e.g., via a cue point pop-up trigger point of conventional systems).

In an embodiment, the interactive video playback system provides an application programming interface (API) overlay to integrate with a video player environment in a manner which is independent of the timeline of the underlying video content. In an embodiment, the API overlay provides an interactive portion that is searchable by the user system at any point in the overlay while the video content is playing along its timeline, without disruption of the video playback or disruption of the associations created between the overlay and the underlying video content. According to embodiments, the API overlay can include a set of subroutine functionality definitions, protocols and tools utilized in programming videos for use with the video player as described herein across platforms and incorporating communication from outside software platforms.

In an embodiment, the overlay is cross-referenced or mapped to the video content such that in response to the appearance of a cue object in the video content, the overlay is configured to provide a set of information (e.g., information about an item associated with the cue object, purchasing functionality) in response to a user interaction. In an embodiment, the overlay provides the set of information that is mapped or associated with the one or more cue objects, while being timeline independent. In an embodiment, while the video content represents a stream of information playing along a timeline (e.g., the video timeline), the overlay provides a set of information relating to the one or more cue objects within the video content.

According to embodiments, the interactive video playback system enables flexibility for user systems to view video content and engage in e-commerce, without disrupting the video viewing and consumption experience. In an embodiment, there can be a 'wishlist' saving certain cue object to come back to later for more information or to send to someone else who may have interest. In an embodiment, a cue object can be bookmarked to watch again later, either by returning to the video or within the player but independent of the particular video from which they came. In an embodiment, transactions associated with the cue objects are capable of execution and completion within the interactive video playback system.

In one embodiment, a separate entity, either an entity associated with the provider of a video player, or some other existing or specially created entity, acts a source purveyor of an item (e.g., a good or service) offered for sale through the interactive video playback system. The separate entity engages with various other purveyors of goods and services (e.g., a third party e-commerce platform, such as Amazon®) to procure the desired items and to have them provided directly to the consumer, wherein the consumer is billed and charged by the separate entity. From a consumer's point of view, they will be conducting the transaction with the separate entity, having paid the separate entity, returning any product or service to the separate entity, receiving any applicable refund directly through the separate entity. In this example, the consumer transacts with the separate entity and can login and establish payment information with the separate entity. In turn, the separate entity, for any good or service available for sale or purchase through the interactive video playback system, can have pre-arranged with any number of various other purveyors of goods and services the availability of and terms for such other goods and services and obtained pre-approval for the sale and purchase of such goods and services at pre-designated prices and terms. The purveyor or fulfillment center can refer to any source of items within the video content that provide one or more of shipment of such items to designated users in exchange for a preset fee, such fee being transferred by the payment handler in exchange for cue object being directly sent to a designated user and such purveyor and/or fulfillment center then remaining responsible for any downstream transaction incidents.

In an embodiment, once the link between the separate entity and purveyor is enabled, and the link between the user system and the separate entity is enabled, the link between consumer and other purveyor is further enabled. This obviates the need to set up any number of direct links between consumer and such number of other purveyors. In one embodiment, the separate entity may set its own prices and additional terms for the purchase and sale of items. In one embodiment, the consumer may transact with the separate entity, but if there are any returns or other issues with the purveyor, they may agree to deal directly with the purveyor to resolve those after transaction issues.

In one embodiment, the interactive video playback system and related methods include a video player that is enabled to playback any suitable video file (e.g., the video content). In an embodiment, the video content can be configured by the interactive video playback system to contain one or more cue objects representing interactive portions with which a user system can interact with one or more items included in video content.

In one embodiment, a cue object is directly clickable upon seeing a corresponding item within the video content. For example, an actor appearing within a video may be wearing a particular pair of sunglasses. The sunglasses can be an item having a corresponding cue object, such that at any point in the video where the sunglasses appear on the screen, a viewer may interact with the cue object to initiate an interactive experience (e.g., allowing the viewer to obtain more information about the sunglasses, including the ability to purchase the item). In an embodiment, the interactive video playback system can generate an interactive portion including a menu and may be able to obtain the information and purchase functionality from such proprietary menu bar enabled within the video player, at any time, whether or not the cue object is currently 'on-screen'. In an alternative embodiment, cue objects viewable within the proprietary menu bar may be only those currently 'on-screen.' In an alternative embodiment, there can be a menu bar toggle switch in which the user can dictate which cue objects are viewable at any given point.

In one embodiment, the interactive video playback system and related methods provide users the ability to interact with cue objects, rather than have conventional cue point triggers along a timeline forced into the viewing experience to prompt a user to make a selection or perform an action. In this embodiment, the viewer has complete discretion when and how or even if, to interact with the video. This is akin to a 'pull' of information rather than a 'push', a system that pushes you to interact at certain trigger points along the way.

In one embodiment, the interactive video playback system and related methods provide the user alternative interactive viewing experiences such as to change the viewing angle—instead of viewing the current scene from the front, a user may be able to choose to view the scene from the side, or the back, or from overhead. This feature is described in greater detail below.

In one embodiment, a user system (e.g., a viewer or user) can login to the video player to enable all functionality, such as the ability to purchase cue objects in a single click. In one embodiment, there may be a pre-arrangement with a fulfillment center such as Amazon® that is able to fulfill orders. A user can log in to a video player account, which is pre-linked to their Amazon® account (or any other one or more such e-commerce partners) such that when the user interacts with a cue object and desires to purchase, the user system is able to purchase directly within the video player, without being redirected to another destination (e.g., an e-commerce website or application). In an embodiment, transaction information (e.g., purchase information, delivery information, user information) can be pre-configured within the video player. In an alternative embodiment, the user can establish an account associated with the login to the video player, without having an account with a fulfillment center which fulfills a transaction. In this embodiment, the payment handler of the interactive video playback system maintains an account with the fulfillment center and processes any order through the account of the interactive video playback system, directing delivery to the user.

In one embodiment, the user system, upon logging into the video player (e.g., either a third party video player or a video player of the interactive video playback system) can purchase cue objects from any number of purveyors or fulfillment centers with a single interaction (e.g., a single click). In an embodiment, the user system logs in to the interactive video playback system, without logging in to a purveyor or fulfillment center. In turn, the interactive video playback system coordinates with one or more purveyors and/or fulfillment centers for the direct provision of goods and services at the direction of the interactive video playback system on pre-determined prices and terms. In an embodiment, the interactive video playback system executes the transaction with the user system (e.g., according to the prices and terms as set by the pre-determined prices and terms of any number of other purveyors and/or fulfillment centers). In this manner, there does not need to be a separately enabled link between the user system and a purveyor and/or fulfillment center, in that the established link (e.g., account login) between the user system and the interactive video playback system serves as a global link for the purposes of fulfilling a transaction initiated and completed via the interactive video playback system.

In one embodiment, the interactive video playback system includes geo-location enablement, where, with user approval (e.g., based on preferences set by the user, default preferences, etc.), the interactive video playback system identifies a location of the user system at the time of transaction with the interactive video playback system and selects a fulfillment center located within a predefined zone or distance from the location of the transaction. For example, in this embodiment, an item (e.g., a cue object) may be a pizza of no particular brand within the video content (e.g., a scene where two people are eating a pizza). The user system may interact with an interactive portion of the GUI associated with the pizza. The interaction can be processed to identify a pizza provider within a certain geographic distance from the location of the user system. The interactive video playback system can further determine that the identified purveyor has a location open and able to deliver a pizza within a predefined time to the user system location, and then, in response, offer the user the ability to purchase and have delivered, a pizza.

In one embodiment, the interactive video playback system includes a lead generation module. In this embodiment, any product or service that is enabled as a cue object, where the user demonstrates any interest—for example, touches it to see if it is a cue object (or interacts with a menu bar including one or more interactive portions associated with items)—the interactive video playback system enables the passive collection (e.g., without the user system having to stop to affirmatively fill anything out) of the user data from the user login and forwards the user information to the purveyor of the good or service. The good or service may be fictitious or generic in the video, but may be of a type that is desired by the user. For example, there may be a law firm in the video—a made up one for the purposes of the video. But, the user, in need of real legal services may investigate it as a cue object. The interactive video playback system collects the information associated with the user system interacting with the legal services as a cue object and forwards the lead information to pre-enabled legal services providers who may be able to provide the assistance the user was investigating. In certain embodiments, the lead generation module can be combined with the geo-location feature described above to provide lead information to relevant purveyors where the good or service provided is local to the user system.

In one embodiment, the interactive video playback system allows seamless switching between video feeds with all cue objects enabled in the multiple different video feeds. For example, in this embodiment, a user system viewing an auto race can "follow" a certain driver. In an embodiment, the interactive video playback system can provide the user system with a camera feed associated with that particular driver. In this example, the cue objects could be products and services displayed by advertisers emblazoned on the car. The user system can decide to view the status of a different driver and switch camera feeds, while all cue objects remain enabled through the multiple different feeds.

In one embodiment, the interactive video playback system can provide a user system with an option to dismiss or block a cue object. For example, the user system can communicate information to the interactive video playback system that he or she has no interest in obtaining further information about a specific cue object. As a result, the cue object can be dismissed, such that the interactive video playback system blocks further interactions with the cue object (e.g., does not generate an interactive portion associated with the cue object). In this embodiment, the user system can restore all cue objects and re-obtain the ability to interact with previously dismissed cue objects.

In one embodiment, the interactive video playback system is cross-platform enabled, such that no special applications or plugins are required and the functionality is enabled through an overlay configured for use with a suitable third party video player. Thus, whether a user is engaging social media, such as Facebook®, or surfing the Internet using any common web browser such as Chrome®, a user system can play video content using a video player of the interactive video playback system or a third party video player to load video content including the functionality described herein. In one embodiment, user systems can login to an account associated with the video player to enable additional functionality, such as one-click ordering, without having to operatively couple with an e-commerce platform.

In one embodiment, a user system can particular video content with other user systems by emailing or texting a link to the particular video or sharing across social engagement platforms. In one embodiment, a seamless viewing experience across platforms is provided wherein a user system viewing a particular media feed within a social media platform (e.g., the Facebook® platform) has substantially the same viewing experience and substantially the same interactive ability as a viewer viewing the same video feed on the open web or within an alternative application. In one embodiment, the interactive video playback system can be utilized to view pre-recorded content, such as video clips to full length movies or television programs. In an alternative embodiment, the interactive video playback system described herein can be utilized to view live events.

FIG. 1 depicts an interactive video playback system 100 and related functionality, according to one or more embodiments of the present disclosure. In an embodiment, as illustrated, the interactive video playback system 100 is configured to execute a video player (e.g., a video player of the interactive video playback system 100 or an external (e.g., third party) video player to load and execute playback of video content. In an embodiment, the video content is pre-configured, prior to loading and playback, to include a mapping or association between one or more cue objects (e.g., items in the video content) and one or more interactive portions. In an embodiment, upon execution of the video player, relevant APIs from e-commerce partners are loaded, and a search feed is enabled. In an embodiment, the video playback is executed and configured to receive an interaction from a user system (e.g., a viewer). In an embodiment, the user system dictates when and what the user system searches or shops for using the one or more interactive portions associated with the video content. In an embodiment, the interactive video playback system processes user interactions within the video player, without calls to external systems (e.g., ad servers, e-commerce platforms, etc.).

Figure 2:
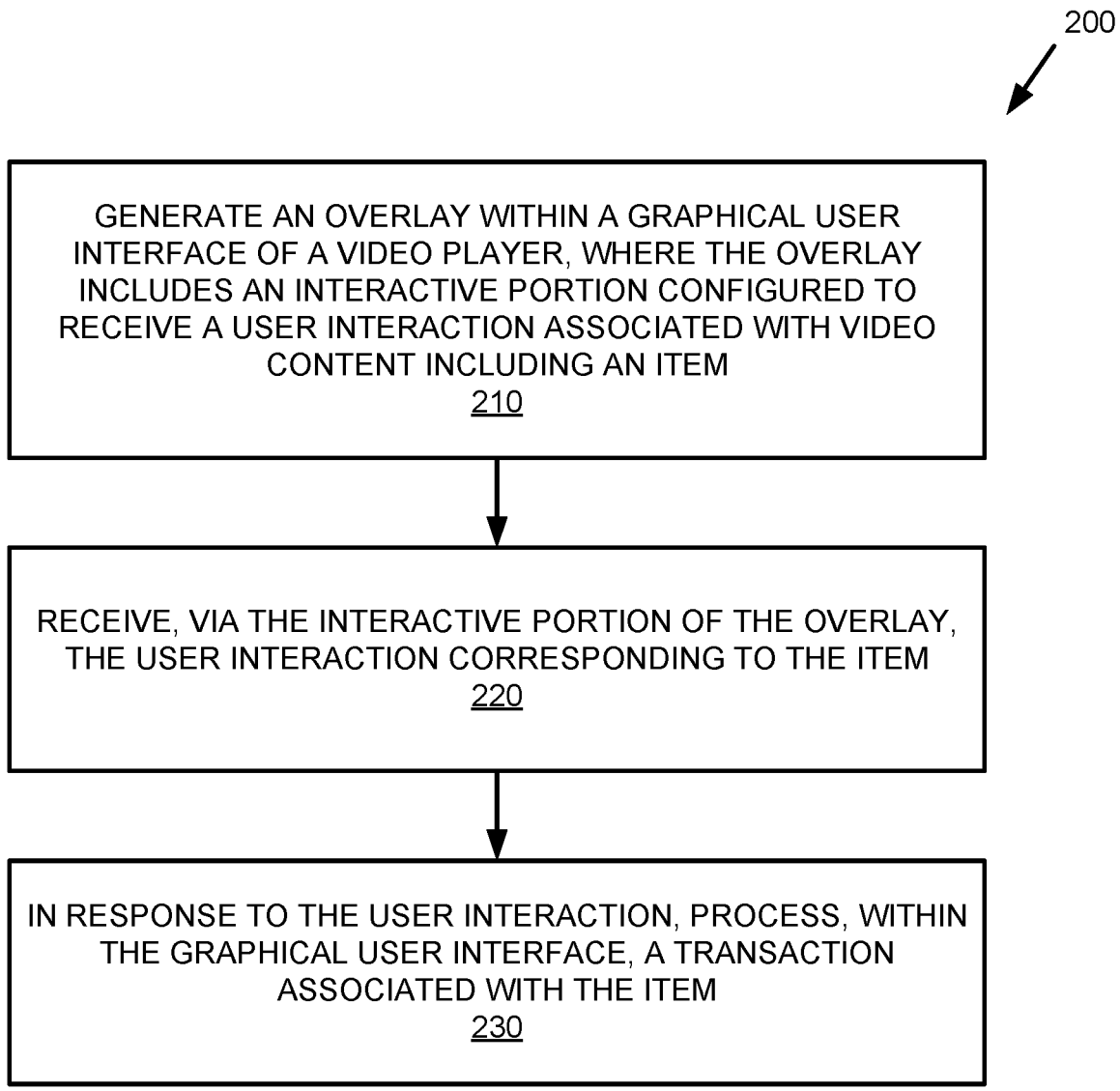
FIG. 2 depicts an interactive video playback system operatively coupled to third party systems in an example computing environment, in accordance with one or more embodiments of the present disclosure.

FIG. 2 is a flow diagram of an example method 200 to process, by a video player, a transaction associated with an item included in video content played by the video player. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the interactive video playback system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In operation 210, the processing logic generate an overlay within a graphical user interface of a video player, where the overlay includes an interactive portion configured to receive a user interaction associated with video content including an item. In an embodiment, the interactive portion can be mapped or otherwise associated with the item in the video content, such that the position of the interactive portion coincides or aligns with a position of the item within the graphical user interface. In an embodiment, the overlay includes a menu having one or more interactive portions each corresponding to a respective item that is available for purchase via the graphical user interface.

In operation 220, the processing logic receives, via the interactive portion of the overlay, the user interaction corresponding to the item. In an embodiment, the user interaction includes any electronic-based action or communication by the user system, such as, for example, clicking on the interactive portion using a computing element (e.g., a mouse or other pointer), a voice command, a keyboard action, etc.). In an embodiment, the user interaction can include a clicking on the item itself as it appears in the video contact being played by the video player.

Figure 7:
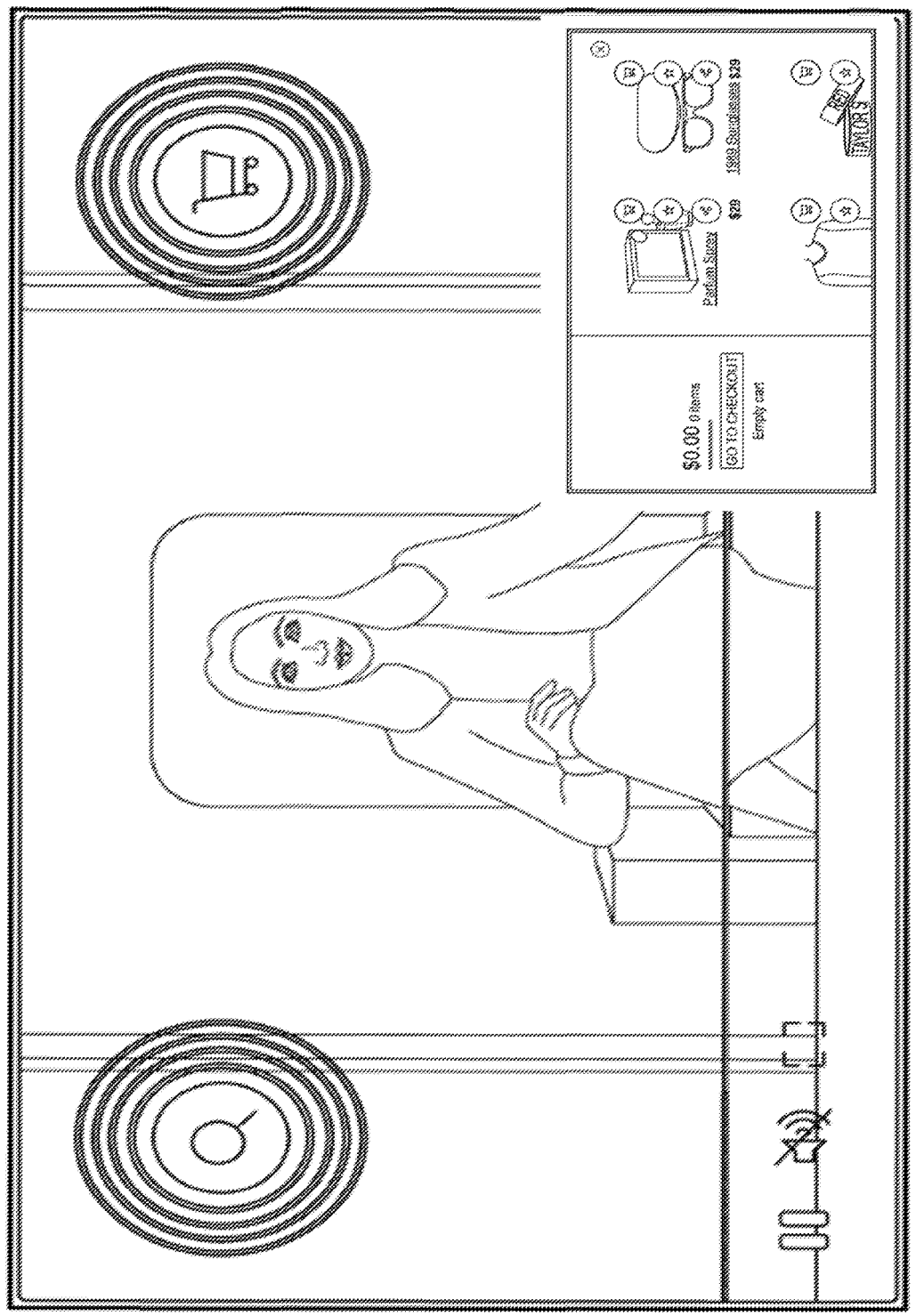
FIGS. 7-9 illustrates example graphical user interfaces including an overlay enabling a purchase transaction associated with one or more items in accordance with one or more embodiments of the present disclosure.

In operation 230, in response to the user interaction, the processing logic processes, within the graphical user interface, a transaction associated with the item. In an embodiment, the transaction includes a purchase of the item. In an embodiment, the entire purchase transaction is completed within the graphical user interface of the video player, without redirecting the user system to another application, website, or platform. In an embodiment, in response to the user interaction, the processing logic generates an additional interactive portion within the graphical user interface to enable the user system to initiate and complete a purchase of the item (e.g., as shown in the example of FIG. 7).

Figure 3:
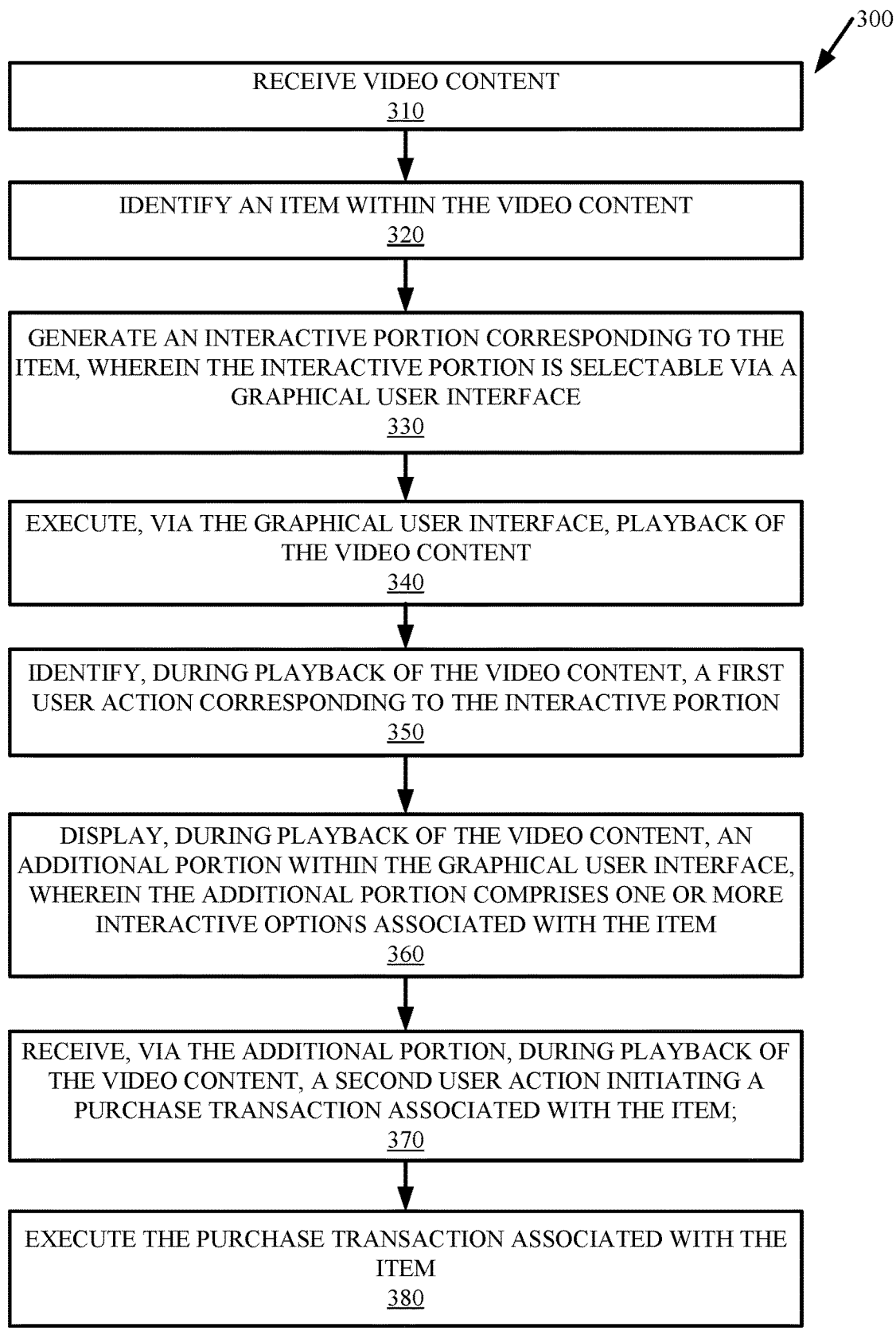
FIG. 3 illustrates an example process flow including operations performed by an interactive video playback system, in accordance with one or more embodiments of the present disclosure.
Figure 4:
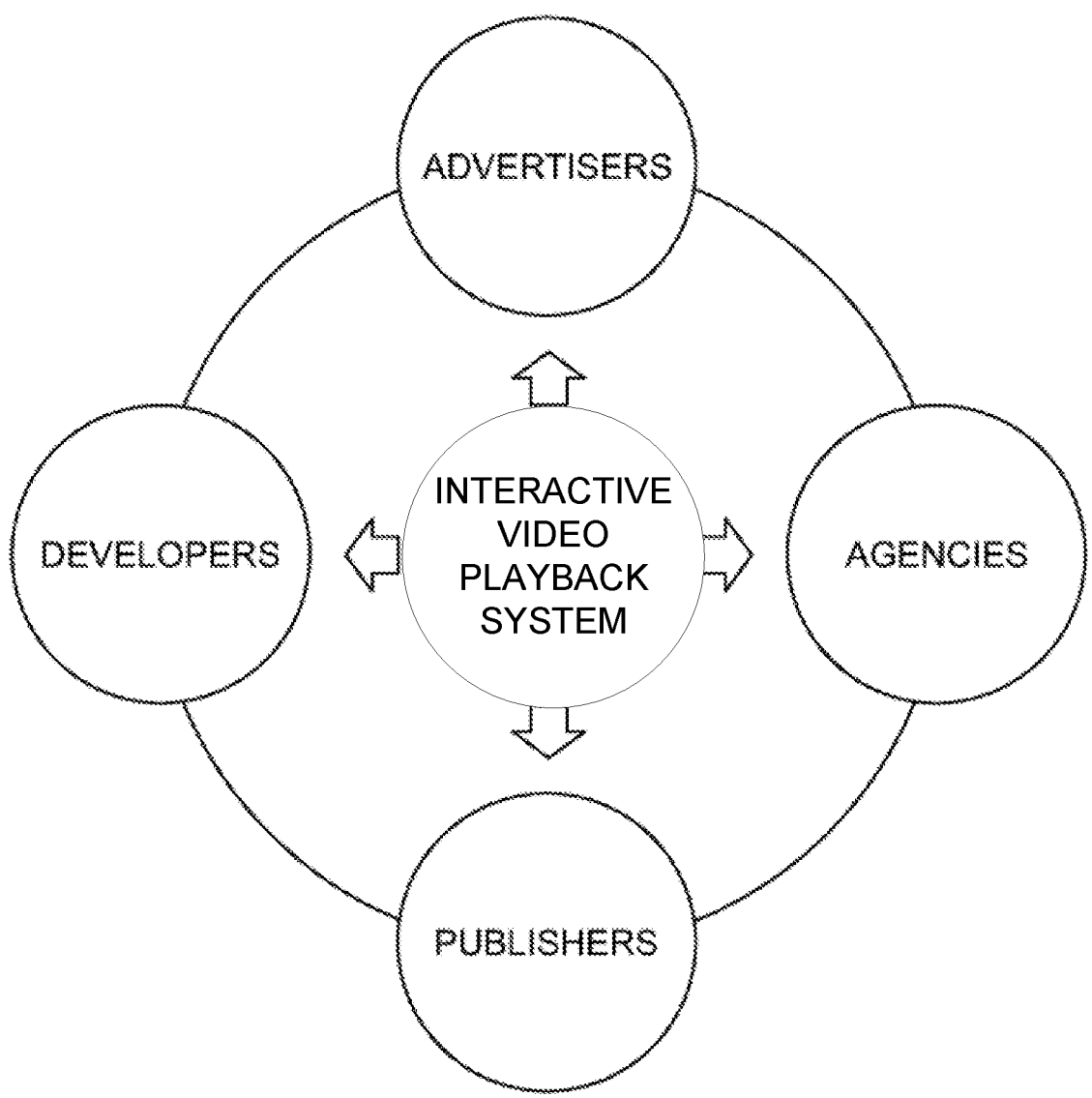
FIG. 4 illustrates an example process flow including operations performed by an interactive video playback system, in accordance with one or more embodiments of the present disclosure.

FIG. 3 is a flow diagram of an example method 300 to process, by a video player, a transaction associated with an item included in video content played by the video player. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the interactive video playback system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In operation 310, the processing logic receives video content. In an embodiment, the video content can be received from a third party source (e.g., content delivery network). The video content can be received as a streaming file or a downloadable media file.

In operation 320, the processing logic identifies an item within the video content. For example, the video content can be reviewed and analyzed to identify the item (e.g., a product or object relating to a service) within the video content. In an embodiment, object detection processing can be employed to identify the item.

In operation 330, the processing logic generates an interactive portion corresponding to the item, wherein the interactive portion is selectable via a graphical user interface of a video player. In an embodiment, the interactive portion can be a link or menu element corresponding to the item. In an embodiment, the processing logic can generate an overlay for display in the video player with the video content, as shown in the example of FIG. 6.

Figure 5:
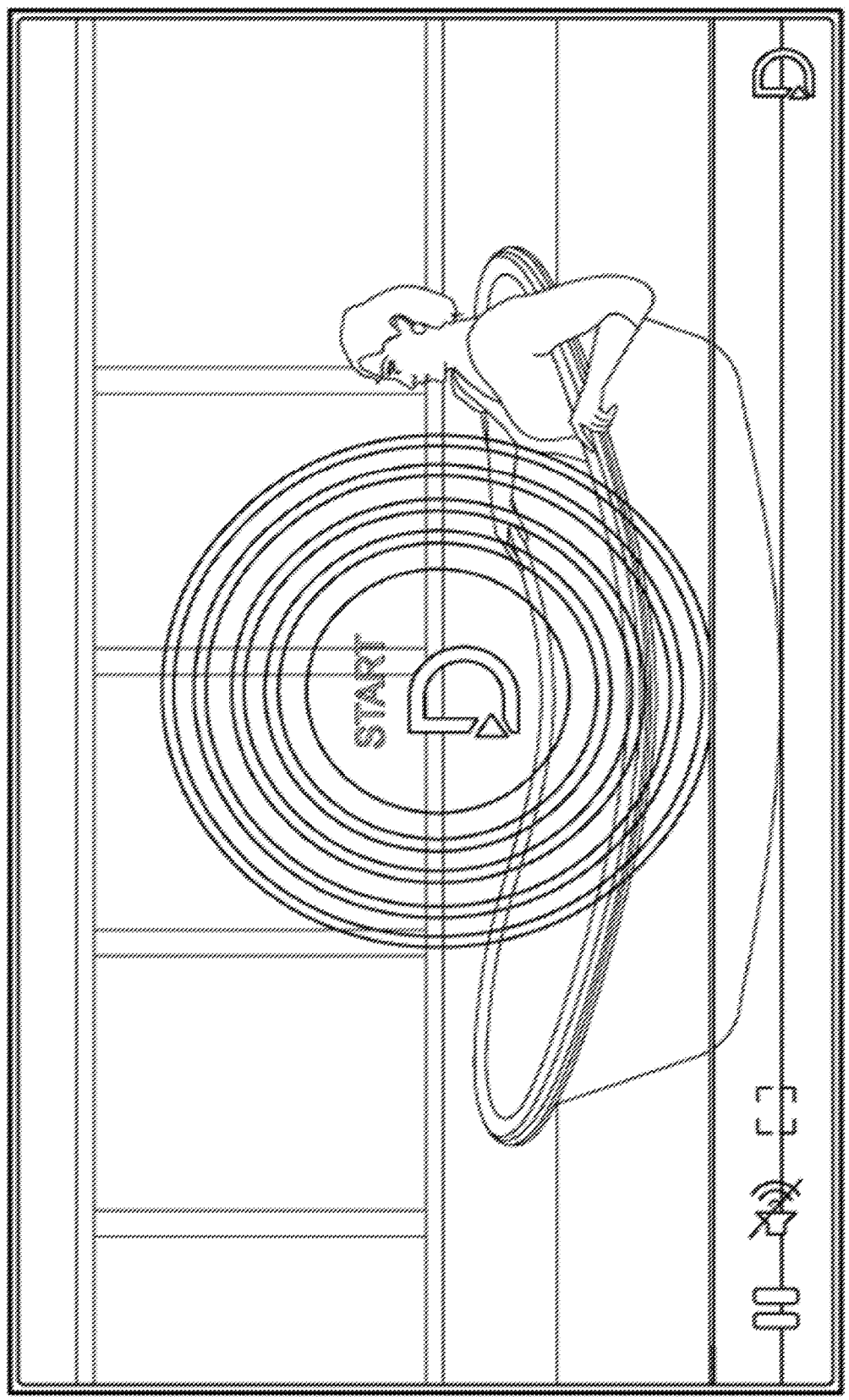
FIG. 5 depicts an example graphical user interface generated by an interactive video playback system, in accordance with one or more embodiments of the present disclosure.
Figure 6:
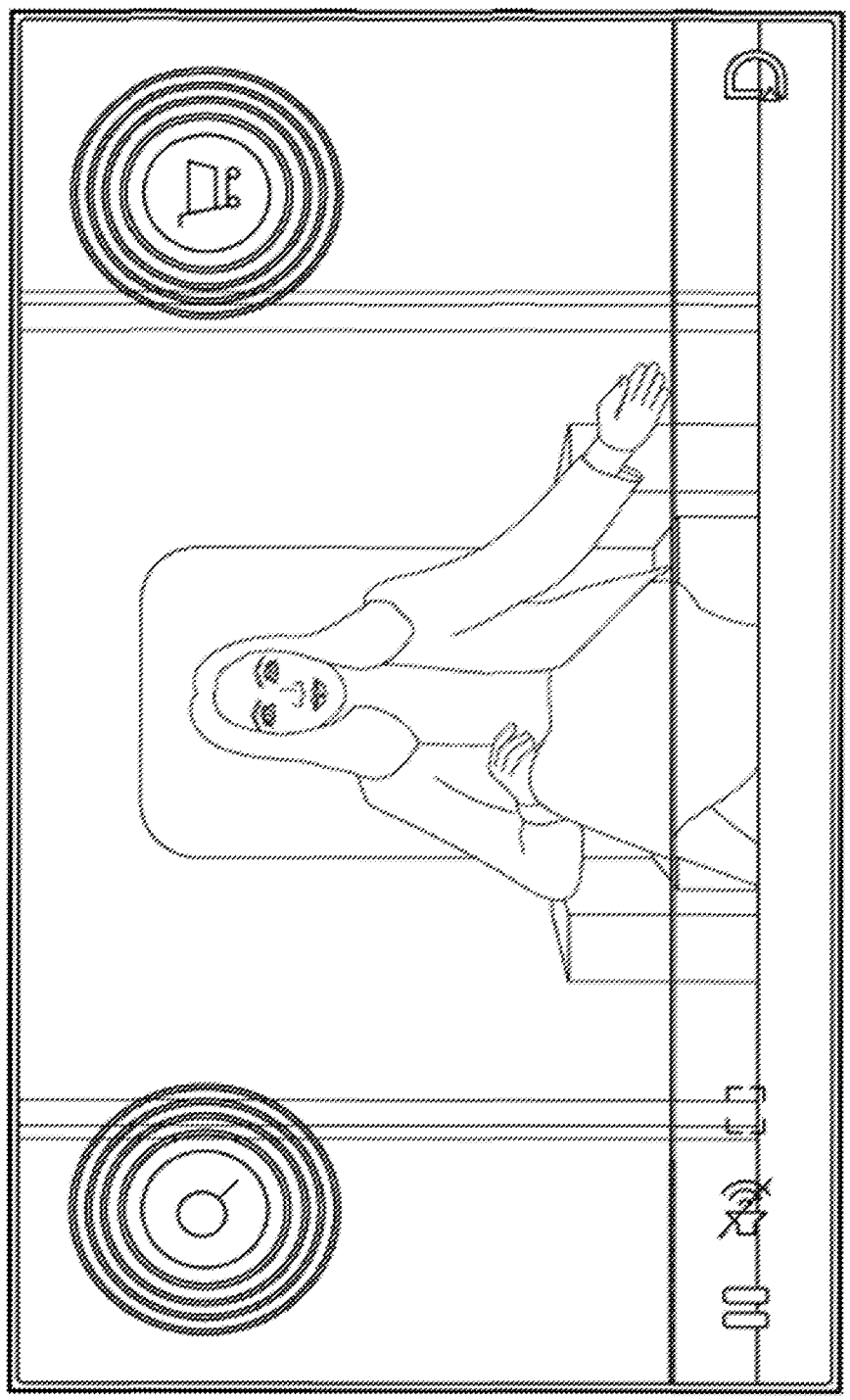
FIG. 6 depicts an example graphical user interface including an overlay relating to an interactive portion related to video content executed by an interactive video playback system, in accordance with one or more embodiments of the present disclosure.

In operation 340, the processing logic executes, via the graphical user interface, playback of the video content (e.g., as shown in FIGS. 5 and 6). In an embodiment, the video content can play within the graphical user interface along with the overlay including the one or more interactive portions corresponding to the one or more items within the video content.

In operation 350, the processing logic identifies, during playback of the video content, a first user action corresponding to the interactive portion. In an embodiment, the first user action can include any suitable user-initiated command or communication, including clicking on the interactive portion corresponding to an item in the video content, a voice command related to the item, etc.

In operation 360, the processing logic displays, during playback of the video content, an additional portion within the graphical user interface, wherein the additional portion comprises one or more interactive options associated with the item. In an embodiment, the additional portion includes a menu of options relating to a transaction corresponding to the item. For example, as shown in FIGS. 7 and 8, the additional portion includes an interactive display that includes information relating to the one or more items in the video content and enables the user system to submit information, selections, etc. relating to a transaction (e.g., purchase) associated with an item shown in the video content.

In operation 370, the processing logic receives, via the additional portion, during playback of the video content, a second user action initiating a purchase transaction associated with the item. In an embodiment, the playback of the video content can be paused while the user system interacts with the additional portion. As shown in the example illustrated in FIG. 7, the additional portion (shown in the bottom right corner of the graphical user interface) includes a shopping cart relating to the one or more items of the video content, wherein the video content can continue to play or be paused in the "background". In an embodiment, the additional portion can completely overlay the video content within the graphical user (as shown in the examples of FIGS. 8 and 9), wherein the video content is paused while the user system interacts with the additional portion. In an embodiment, as shown in FIG. 9, after the user system completes the interactions with the additional portion (e.g., completes the purchase transaction), the user system is presented with an option to "continue watching video" and return to the video content in the graphical user interface of the video player.

Figure 11:
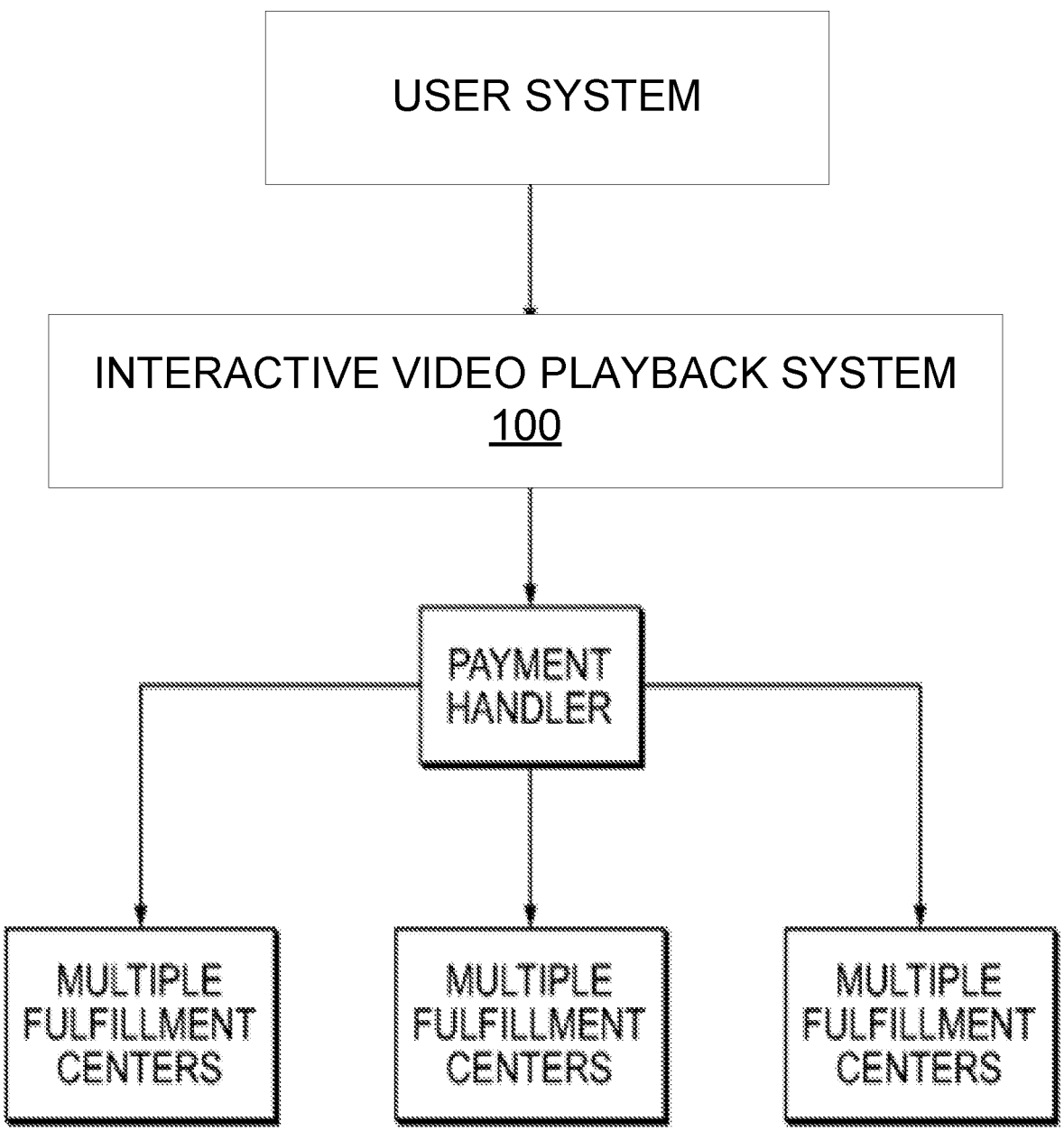
FIG. 11 illustrates an example interactive video playback system and a payment handler module operatively coupled to one or more fulfillment center systems to enable transactions on behalf of a user system, in accordance with one or more embodiments of the present disclosure.

In operation 380, the processing logic executes the purchase transaction associated with the item. In an embodiment, the processing logic executes the purchase transaction using a payment handler (e.g., payment module) on behalf of the user system using one or more third party platforms (e.g., websites, e-commerce platforms, fulfillment centers, etc.), as shown in FIG. 11. In an embodiment, for example, the additional portion can display information to the user system to indicate that the purchase transaction has been completed.

Figure 8:
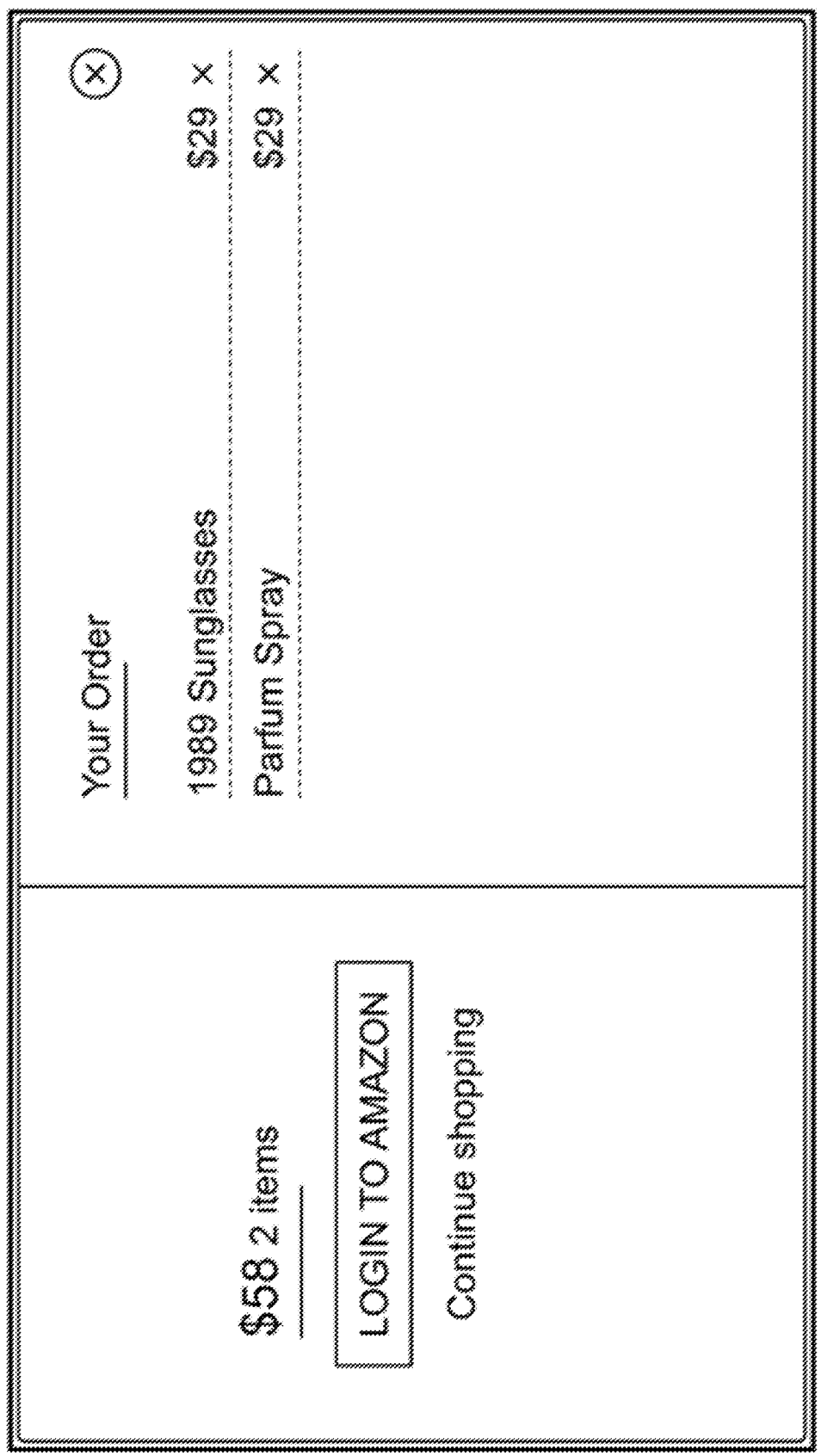
Figure 9:
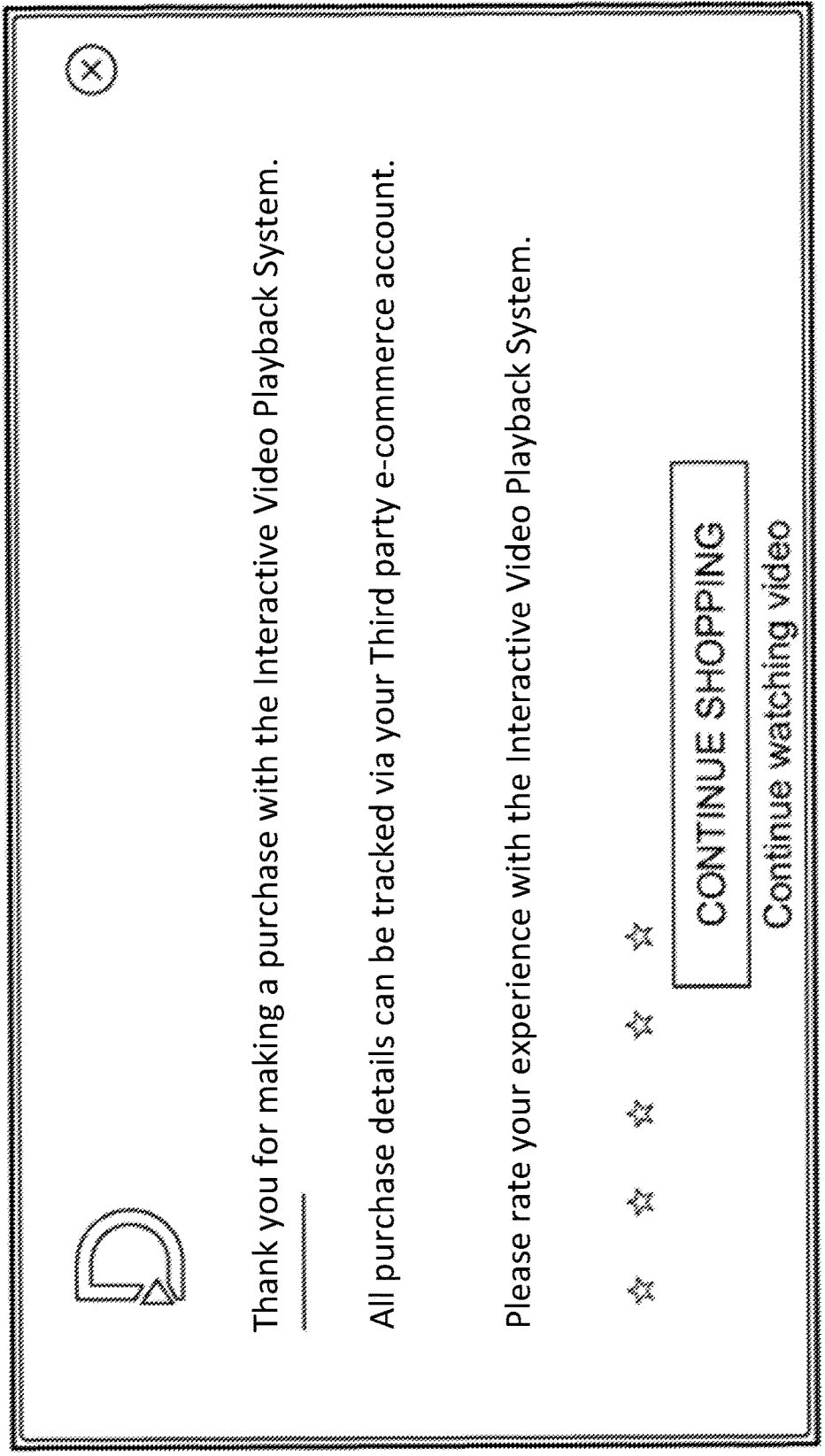

Referring to FIG. 5 through FIG. 9, an embodiment of one particular sequence of events is displayed through a series of screenshots. It is important to note that everything displayed happens within the video player environment. In FIG. 5, an opening screenshot is displayed showing the launch of the player and an icon displayed to start the immersive experience. In FIG. 6, the image displays an embodiment where the user has initiated a proprietary menu where a search icon and a shopping cart icon are displayed enabling the user to interact with any enabled cue object, searching for cue objects or purchasing products associated with a cue object. In FIG. 7, the image displayed is the result of one embodiment where the shopping cart icon was pressed and the ability to purchase certain items associated with cue objects is displayed. In FIG. 8, the image displayed is the result of one embodiment where certain items were selected for purchase. In this particular screenshot, the user is offered the ability to provide, within the confines of the player, their login to Amazon® to complete the purchase. In an alternative embodiment, by logging into the player and having already created the association to an Amazon® (or other e-commerce partner), this login screen can be bypassed. As shown in FIG. 9, the graphical user interface can display information indicating the purchase has been completed and the user system can continue shopping or return to the video content, without having been redirected from the video player.

Figure 10:
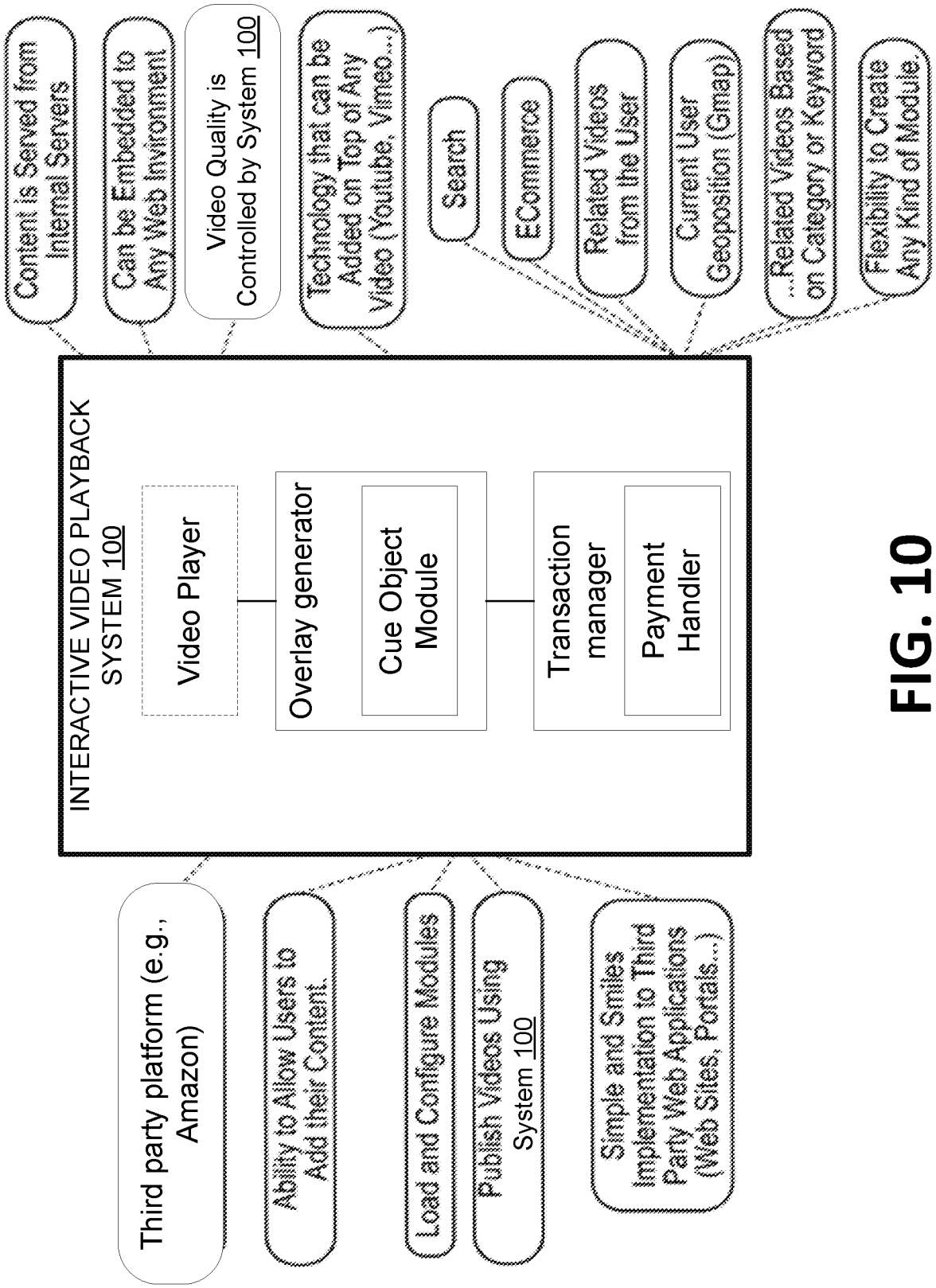
FIG. 10 illustrates an example flowchart relating to an interactive video playback system and related functionality, in accordance with one or more embodiments of the present disclosure.

Referring to FIG. 10, in one embodiment, the interactive video playback system 100 can include modules or program such as a video player, an overlay generator including cue object module, and a transaction manager including a payment handler, according to embodiments of the present disclosure. In FIG. 10, the video player is illustrated in dashed lines to denote that the video player may be part of the interactive video playback system 100 (e.g., a native video player) or an external third party video player to which the interactive video playback system is operatively coupled.

In an embodiment, the overlay generator is configured to generate an overlay corresponding to video content. The overlay generator is a module (e.g., a program or set of instructions) configured to receive content (e.g., via upload from publishers, media owners, content producers, advertisers, etc.), identify cue objects (e.g., items) within in the video content using a cue object module, and generate an overlay including one or more interactive portions corresponding to the cue objects. The interactive video playback system enables video content providers to add their monetization module links within the system. For example, a video content provider can add to the interactive video playback system an API key associated with a third party e-commerce platform (e.g., Amazon®, Shopify®, etc.) or their own proprietary commerce platform API (and thus, enabling analytics within the video content provider experience).

In an embodiment, the interactive video playback system includes (or is operatively coupled to) a video layer configured to enable content integration and API connections that provide the overlay and transaction execution functionality within the video player. In an embodiment, the video player is deployed via code onto a third party media player platform (e.g., which could be a separate website or mobile application or other media providing stream). Once deployed, the video player can execute the modules of the interactive video playback system to enable the features and functionality of the system via the video player, such as, for example, functions including a search function (e.g., to explore local services and businesses), transaction execution functionality (e.g., via the transaction manager and payment handler) to enable the purchase of items from within the video player using interactive portions of the graphical user interface associated with the one or more pre-programmed cue objects.

In an embodiment, the user system is provided with tools to dictates the overall playback experience. In an embodiment, the user system can 'pull' data and information from the video player to enable the execution of transactions associated with the video content.

The interactive video playback system provides a hub for video content, commerce integrations, and analytics. The video content providers can enable their video content for processing via the interactive video playback system, including establishing playlists and sequencing within the video player. In an embodiment, the interactive video playback system is configured to execute, store, and analyze search revenues, click through data, lead generation data, commerce data, and any other related data. According to embodiments of the present disclosure, the interactive video playback system can be deployed as a stand-alone platform or integrated with an existing video player and/or video content provider (e.g., YouTube®, Vimeo®, etc.).

Referring to FIG. 11, in one embodiment, the interactive video playback system 100 includes a payment handler module configured to enable a user system to log in to the payment handler module (or the interactive video playback system 100) and use the single login to accept and process a user payment to complete a transaction with multiple different fulfillment centers without the user having to have an account with any single of the fulfillment centers. In an alternative embodiment, upon a user system logging in to the proprietary technology as described, the payment handler is configured to query whether the user has a specific account with any of the plurality of fulfillment centers and identifies the user to such fulfillment center, if so. In any case, the user experience is seamless within the technology and there is no need for the user to exit the player to either purchase any cue object, get any other information about any cue object, or otherwise interact with a cue object or the player.

Figure 12:
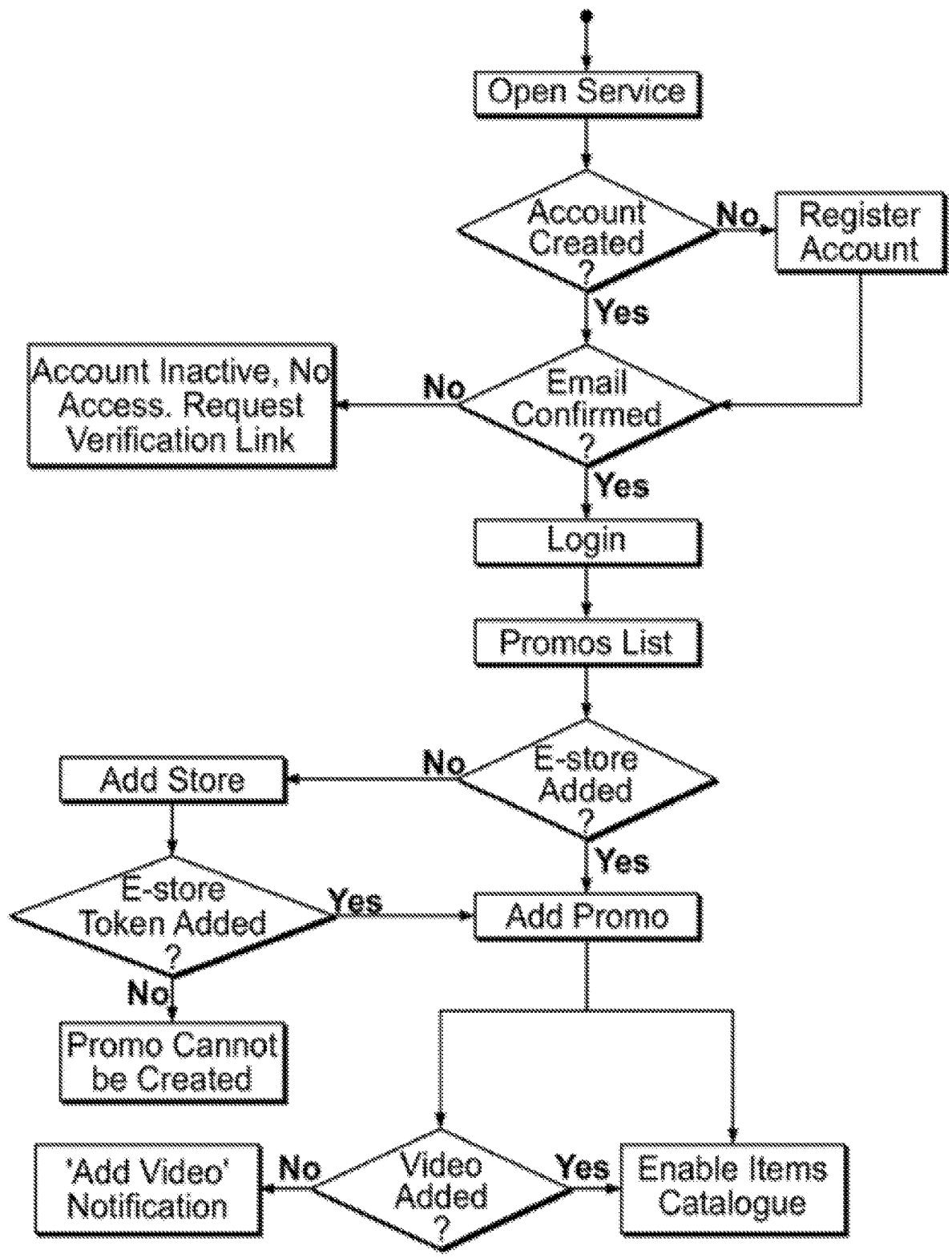
FIG. 12 depicts an example flowchart relating to functionality performed by an interactive video playback system, in accordance with one or more embodiments of the present disclosure.

FIG. 12 depicted is process flow executable by the interactive video playback system in accordance with embodiments of the present disclosure. In an embodiment, the process flow illustrates operations relating to the creation and enablement of video content for playback via the interactive video playback system. In an embodiment, the interactive video playback system receives video content and enables one or more cue objects (e.g., items) and corresponding interactive portions to enable interaction with the video content during playback of the video content.

The present disclosure is further illustrated, but not limited by, the following examples. In one embodiment, the video player of the interactive video playback system can be utilized to view pre-recorded events such as video clips or movies, and the like. In this embodiment, advertisers may choose to engage with the video producers to have certain of their products or services enabled as cue objects within the video stream. In this embodiment, the video media is pre-programmed to enable such cue objects. For example, the video may concern a golf instruction within which a golf instructor will demonstrate a certain new club or golf ball and the proper way to swing using such club. A viewer may be particularly interested in the club, or golf balls, or golf glove, or hat or shirt, etc. that are viewable within the video. Any one or more of these objects can be enabled as a cue object and whenever the viewer sees those objects on the view screen, if pre-configured to be a cue object, the viewer can click on the object to obtain further information and directly purchase the object.

In this embodiment, it becomes a fun experience for the viewer. They are already watching a video they are interested in. Now, the viewing experience is enhanced with greater viewing controls and options. In one embodiment, perhaps various viewing angles are enabled. Thus, a viewer could watch the video from the side to get one view of the instruction of the proper swing path for the club. The viewer could then change the view angle to watch from the front, or behind, or overhead and see the same swing from various angles. At any point, upon becoming interested in any of the products or services on display within the video, the viewer can also interact with any enabled cue object to obtain further information and/or purchase.

In an alternative example, the video player could be exceptionally desirable to view concerts, either live or pre-recorded. In this example and embodiment, the viewer may be able to choose to view the entire band on stage, or choose an alternative view to a close-up of one particular band member. This may be particularly desirable for a viewer desiring to see a lead solo or having a particular interest in the drummer, for example. Each viewer may have their own unique viewing experience. In this example, though, all viewers will have the same ability to interact with enabled cue objects at any point and may, for example, have the ability to purchase the version of the song being played, or t-shirts, or other band songs, or instruments, or any of a plethora of items that could be enabled as cue objects.

In an alternative embodiment, the video player could be exceptionally desirable to view mystery—'who-done-it'— videos where cue objects could be interacted with by viewers to obtain more information as they are relevant to the story line. This would encourage viewers to interact with all cue objects in an effort to 'figure out' the mystery. Along the way, they may also be enticed to purchase products or services offered for sale.

In these embodiments, it is important to note that viewers choose how and when to engage with cue objects. The viewer is enticed to interact and not prompted to interact. One of skill in the art will appreciate the many additional features that could be programmed as interactive engagement on demand features that would further entice viewers to interact with additional elements of the viewing experience and thereby offer additional opportunities for advertisers.

Figure 13:
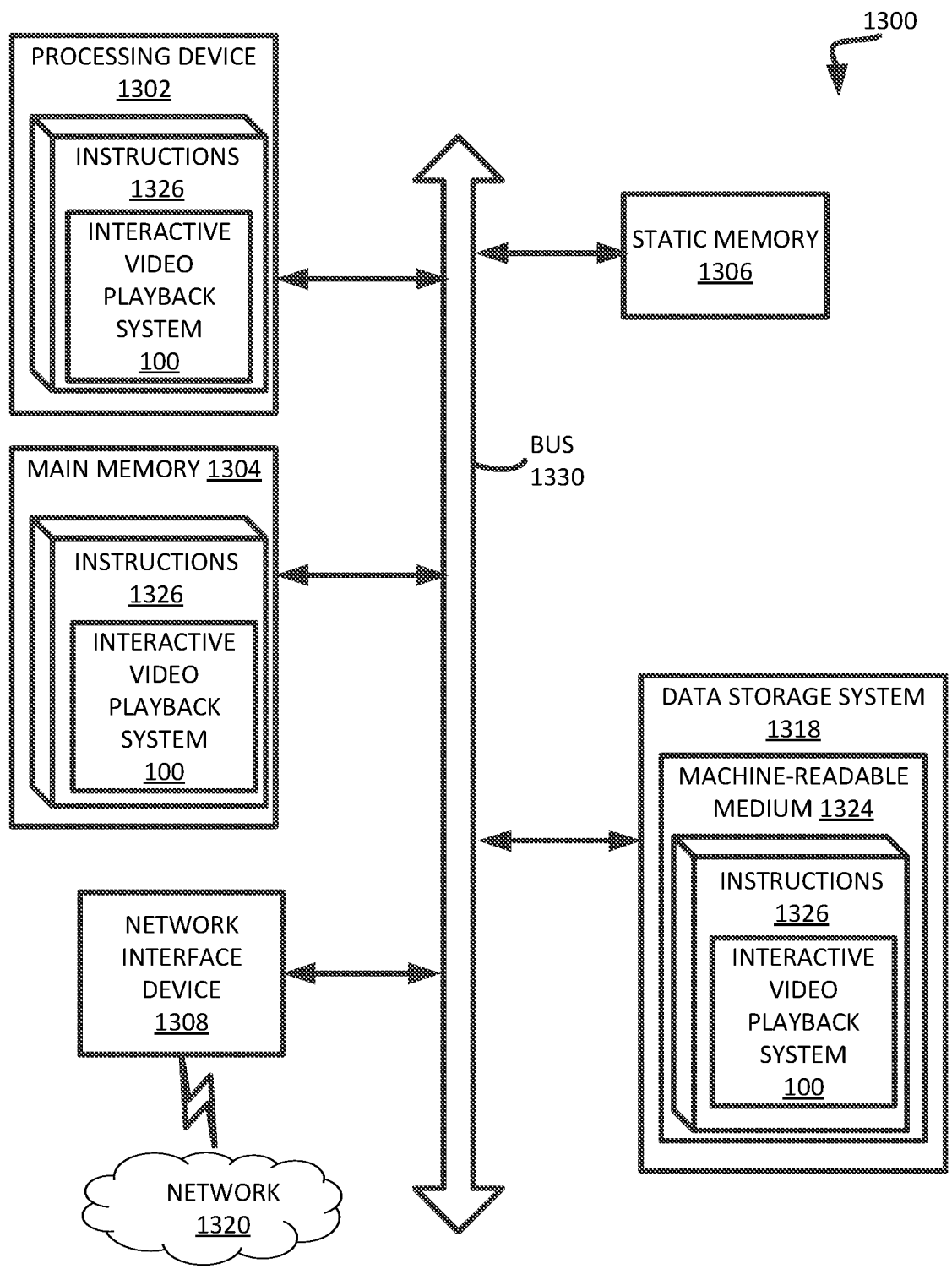
FIG. 13 is a block diagram of an example computer system that may perform one or more of the operations described herein, in accordance with various implementations.

FIG. 13 illustrates an example machine of a computer system 1300 within which a set of instructions, for causing the machine to perform any one or more of the methodologies discussed herein, can be executed. In some embodiments, the computer system 1300 can correspond to one or more computing devices configured to perform operations corresponding to the interactive video playback system 100 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a data storage system 1318, which communicate with each other via a bus 1330.

Processing device 1302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 can also be one or more special-purpose processing devices such as an application specific integrated circuit (ASIC), a field programmable gate array (FPGA), a digital signal processor (DSP), network processor, or the like. The processing device 1302 is configured to execute instructions 1326 for performing the operations and steps discussed herein. The computer system 1300 can further include a network interface device 1308 to communicate over the network 1320.

The data storage system 1318 can include a machine-readable storage medium 1324 (also known as a computer-readable medium) on which is stored one or more sets of instructions 1326 or software embodying any one or more of the methodologies or functions described herein. The instructions 1326 can also reside, completely or at least partially, within the main memory 1304 and/or within the processing device 1302 during execution thereof by the computer system 1300, the main memory 1304 and the processing device 1302 also constituting machine-readable storage media. The machine-readable storage medium 1324, data storage system 1318, and/or main memory 1304 can correspond to a memory including instructions 1326 relating to the interactive video playback system 100 of FIG. 1.

In one embodiment, the instructions 1326 include instructions to implement functionality corresponding to a program management component (e.g., the interactive video playback system of FIG. 1). While the machine-readable storage medium 1324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
configuring, by a processing device, an application programming interface (API) overlay associated with a video player that is independent of the timeline of the video player video content and is configured via an overlay generator to comprise an interactive portion wherein said overlay is independent of the video content file, said API overlay configured to provide a set of information in response to an interaction by a user within said interactive portion of the overlay during playback of video content in accordance with a video timeline by the video player, and wherein said API overlay is configured to allow loading of relevant APIs from chosen e-commerce partners and further configured to operate without disruption of the video playback or disruptions of associations created between said API overlay and said video player video content;
generating, by the processing device in accordance with the configuring, said API overlay associated with the video player;
receiving, via the interactive portion of said API overlay, the interaction corresponding to the set of information; and
in response to the interaction, displaying the set of information within said API overlay.

2. The method of claim 1, wherein playback of the video content continues in the video player in accordance with the video timeline during the displaying of the set of information.

3. The method of claim 1, further comprising:
receiving a further interaction with the set of information comprising a request to process a transaction;
processing the transaction in response to the further interaction;
pausing the playback of the video content during the processing of the transaction; and
continuing the playback of the video content in accordance with the video timeline following completion of the processing of the transaction.

4. The method of claim 1, further comprising generating a menu in the overlay, wherein the menu comprises the interactive portion associated with the set of information.

5. The method of claim 1, further comprising:
storing login information associated with a user, wherein the login information comprises payment information; and
retrieving the payment information for use in completing a transaction associated with an item via the overlay.

6. The method of claim 1, wherein the video content comprises an end point, and wherein the playback of the video content continues without interruption to the end point during the displaying of the set of information in the overlay.

7. The method of claim 1, further comprising executing, via the overlay, a transaction comprising a purchase of an item associated with the set of information during playback of the video content in accordance with the video timeline.

8. The method of claim 1, wherein the overlay is operatively coupled to a transaction platform using a key within said application programming interface (API) associated with the transaction platform.

9. The method of claim 8, wherein the set of information is received by the overlay from the transaction platform using the API key associated with the transaction platform.

10. The method of claim 1, wherein the interaction comprises clicking on the interactive portion corresponding to the set of information at a first time, wherein the set of information is independent of a segment of the video content displayed at the first time.

11. The method of claim 1, further comprising generating, in response to the user interaction corresponding to the set of information, an additional interactive portion within the overlay providing functionality to enable a purchase of an item.

12. The method of claim 1, wherein a transaction associated with item is completed within the overlay without disruption of the playback of the video content.

13. A system comprising:
a memory comprising instructions; and
a processing device operatively coupled to the memory the processing device to execute to the instructions to:
configure an application programming interface (API) overlay associated with a video player that is independent of the timeline of the video player video content and is configured via an overlay generator to comprise an interactive portion wherein said overlay is independent of the video content file, said API overlay configured to provide a set of information in response to an interaction by a user within said interactive portion of the overlay during playback of video content in accordance with a video timeline by the video player, and wherein said API overlay is configured by loading relevant APIs from chosen e-commerce partners and further configured to operate without disruption of the video playback or disruption of associations created between said API overlay and said video player video content;
execute, by the video player, the playback of the video content in accordance with the video timeline;
generate said API overlay comprising an interactive portion associated with an item;
process a user action corresponding to the interactive portion; and
execute, within said API overlay, a purchase transaction associated with the item, wherein the purchase transaction is completed within said API overlay without interruption of the playback of the video content.

14. The system of claim 13, the processing device to:
store information associated with a user, wherein the information comprises payment information;
retrieve the payment information; and
execute the purchase transaction using the payment information during playback of the video content.

15. The system of claim 13, wherein the interactive portion comprises an icon corresponding to the item.

16. A non-transitory computer-readable storage medium comprising executable instructions that, if executed by a processing device, cause the processing device to:
configure an application programming interface (API) overlay associated with a video player that is independent of the timeline of the video player video content and is configured via an overlay generator to comprise an interactive portion wherein said overlay is independent of the video content file, said API overlay configured to provide a set of information in response to an interaction by a user within said interactive portion of said API overlay during playback of video content in accordance with a video timeline by the video player, and wherein said API overlay is configured by loading relevant APIs from chosen e-commerce partners and further configured to operate without disruption of the video playback or disruption of associations created between said API overlay and said video player video content;

generate, in accordance with the configuring, said API overlay associated with the video player, wherein said API overlay comprises an interactive portion configured to receive a user interaction corresponding to an item displayed in the video content;

receiving, via the interactive portion of said API overlay, the user interaction corresponding to the item; and in response to the user interaction, processing via said API overlay, a transaction associated with the item.

17. The non-transitory computer-readable storage medium of claim 16, the processing device to:

receive a further interaction with the set of information provided by said API overlay; and process a transaction in response to the further indication;

wherein said API overlay is operatively coupled to a transaction platform using a key within said application programming interface (API) associated with the transaction platform;

and wherein the set of information is received by said API overlay from the transaction platform using the API key associated with the transaction platform.

\* \* \* \* \*